United States Patent [19]

Nishimura et al.

[11] Patent Number: 4,634,227

[45] Date of Patent: Jan. 6, 1987

[54] OPTICAL MODULATING DEVICE HAVING PROJECTION ON SUBSTRATE FOR REGISTRATION

[75] Inventors: Norihisa Nishimura; Yuko Suga, both of Tokyo; Takeshi Miyachi, Yokohama; Yuichi Masaki, Kawasaki, all of Japan

[73] Assignee: Canon Kabushiki Kaisha, Tokyo, Japan

[21] Appl. No.: 632,230

[22] Filed: Jul. 19, 1984

[30] Foreign Application Priority Data

Jul. 22, 1983 [JP] Japan ................... 58-134847

[51] Int. Cl.⁴ .................................................. G02F 1/13
[52] U.S. Cl. ........................................ 350/334; 350/344
[58] Field of Search ................................ 350/334, 344

[56] References Cited

U.S. PATENT DOCUMENTS

| 4,297,004 | 10/1981 | Nishimura et al. | 350/334 X |
| 4,422,731 | 12/1983 | Droguet et al. | 350/344 |
| 4,448,491 | 5/1984 | Okubo | 350/344 |
| 4,458,987 | 7/1984 | Sasaki et al. | 350/344 X |

Primary Examiner—John K. Corbin
Assistant Examiner—Richard F. Gallivan
Attorney, Agent, or Firm—Fitzpatrick, Cella, Harper & Scinto

[57] ABSTRACT

An optical modulator having a layer of optical modulating substance between a pair of electrode-supporting plates is provided, which is characterized in that at least one of the electrode-supporting plates is provided with a mark for registration and the other substrate is provided with a projection for registration at the position corresponding to that of the mark for registration.

27 Claims, 3 Drawing Figures

OPTICAL MODULATING DEVICE HAVING PROJECTION ON SUBSTRATE FOR REGISTRATION

BACKGROUND OF THE INVENTION

1. Field of the Invention

The present invention relates to an optical modulating device suitable for an active matrix type of display panel, and more particularly to an optical modulating device utilizable as an active matrix type of liquid crystal display panel provided with a matrix substrate which is incorporated with a driving semiconductor array.

2. Description of the Prior Art

In the fabrication of conventional display panels, there are difficulties in the registration of the substrate which supports row and column electrodes and semiconductor driving circuits in the proper position relative to the counter-electrode-supporting substrate. The quality of images formed on the resulting display panel is affected by the accuracy of the registration. In particular, when the counter-electrode-supporting substrate is provided with, for example, color filters, the superposition of the two substrates requires very precise registration in order that each color filter may exactly be registered in relation to the opposing dot electrode on the semiconductor driving circuit substrate. If the registration is not precise, color deviation will occur, leading to images of a poor quality.

Accordingly, in the conventional display panels, some marks are put on both substrates at the corresponding positions and the substrates are superposed based on the marks.

In such a conventional method of registration, however, a gap between the pair of marks causes difficulty in the exact registration of each color filter to the opposing dot electrode for the active matrix type of color display panel employing a semiconductor driving circuit substrate where high accuracy of registration is required. In display panels provided with segment electrodes, the registration tolerance can be enlarged by making the figure eight segment of one of the opposing segments larger in width that that of the other. However, in color display panels of the active matrix type, the tolerance of the registration of each color filter to the opposing dot electrode is extremely small, therefore requiring a higher accuracy of the registration between the substrates.

SUMMARY OF THE INVENTION

An object of the invention is to provide a method for achieving a highly accurate registration between the two substrates of a display panel and to provide display panels assembled according to this method.

A further object of the invention is to provide color display panels wherein each color filter is registered relative to the opposing dot electrode with a high degree of accuracy.

These and other objects of the invention are achieved with an optical modulating device having a layer of optical modulating substance between a pair of electrode-supporting plates, characterized in that at least one of the electrode-supporting plates is provided with a mark for registration and the other electrode-supporting plate is provided with a member for registration at the position corresponding to that of the mark.

DETAILED DESCRIPTION OF THE PREFERRED EMBODIMENTS

Figure 1:
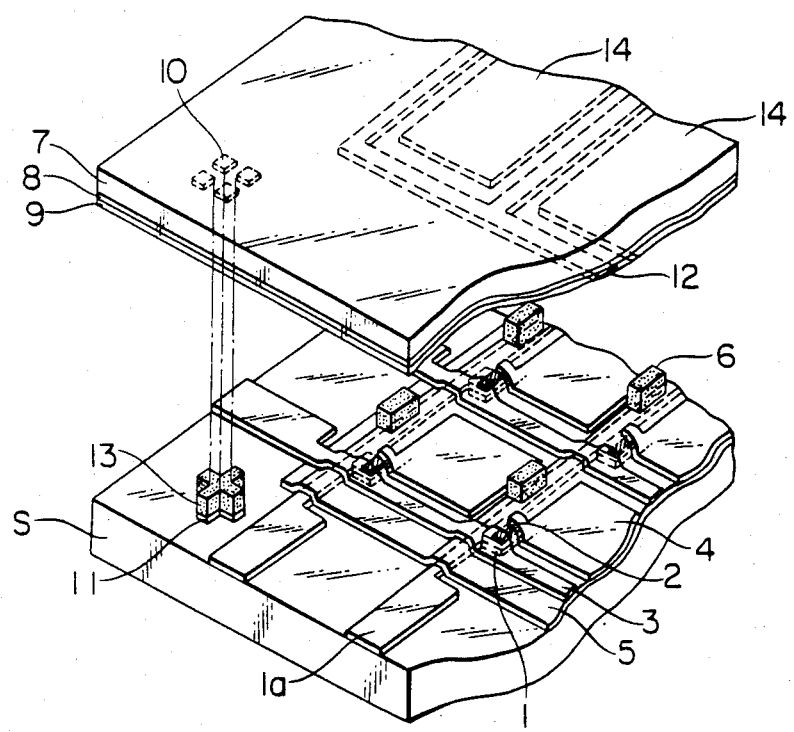
FIGS. 1 and 2 are fragmentary perspective views of display panels of the invention.

The fine projection for the registration used in the invention can function also as a spacer when formed in a height equal to the prescribed gap between the pair of electrode-supporting plates. A plurality of such projections can provide a more efficient spacing function. In preferred embodiments of the invention, the mark and projection for registration can be disposed outside the effective display area or in the light-intercepting area, for example, on gate or source wires formed of aluminum or chromium on the semiconductor driving circuit which is provided with thin film transistors (TFT) acting as switching elements.

Referring now to the drawings, the invention is described.

FIG. 1 is a fragmental perspective view of an embodiment of the invention, wherein; 1a denotes a gate wire (a row electrodes) disposed on a substrate S (made of glass or a plastic); 1 denotes a gate electrode (made of chromium or aluminum) provided on gate wire 1a; 2 denotes a thin semiconductor layer (made of amorphous silicon, tellulium, poly-silicon, or CdS) laid over gate electrode 1 through an insulation layer 5 (made of silicon nitride or magnesium fluoride); 3 denotes a source wire (a column electrode) which is in contact with an end of the semiconductor layer 2; 4 denotes a drain electrode (a dot electrode) which is in contact with the other end of semiconductor layer 2; 5 denotes the above-said insulation layer laminated upon gate electrodes 1; 6 denotes a spacer disposed on gate wire 1a; and 11 is an opaque mark (an aluminum or chromium film) or transparent mark (an indium oxide or tin oxide film) for reigstration positioned outside the display area. On another substrate 7 supporting a counter electrode 8, of the liquid crystal display panel, a pattern of an opaque member (made of, e.g. chromium) is formed which functions as black stripes and a registration mark 10 opposing registration mark 11. Further, registration mark 10 is covered with an insulation layer 9 (made of SiO, SiO$_2$, polyimides, polyamides, polyvinyl alcohol, or alkyd resins). Drain electrodes 4 and counter electrode 8 may each be formed of a transparent conductive film of indium oxide, tin oxide, or TIO (tin-indium oxide). Drain electrodes 4 may also be formed of Al, Cr, or Ag.

A projection 13 for registration is fitted on registration mark 11 which is formed on substrate S. This projection 13 may preferably formed simultaneously with the spacers 6 by using the same photo-resist material. That is, projection 13 can be formed by applying a photo-resist on the semiconductor driving circuit substrate which is provided with gate wires 1a, source electrodes 3, thin simiconductor films 2, and drain electrodes 4, exposing the resulting photo-resist film to light through a masking film, except the areas corresponding to the registration mark 11 and to the spacers 6, and removing the unexposed portions of the photo-resist film. The photo-resist film (made from a photosensitive resin), curable by irradiation with actinic rays such as ultraviolet rays, is treated with a developing liquid after irradiation through the mask. Thereby the unexposed portions of the photo-resist film are removed, and the remaining portions of the photo-resist film are further cured by heating, thus forming registration projections 13 and spacers 6. Alternatively, a non-photosensitive thermosetting resin solution is applied on the semiconductor driving circuit substrate, dried to form a solid film, and coated with a photosensitive resin. The resulting photosensitive resin is exposed to light through the prescribed mask and developed to form a photo-resist mask. Then the photo-resist mask-free portions of the thermosetting resin, which is not yet cured, are removed by dissolution, and further the photo-resist mask is removed. Thereafter, the remaining portions of the thermosetting resin film are cured by heating to form registration projection 13 and spacers 6.

Suitable thermosetting resins for use herein include epoxy resins containing an amine and acid anhydride, or polyamide acid which form polyimides on heating.

Suitable photo-resists for the above purpose are rubber photo-resists, particularly cyclized polyisoprene photo-resists and cyclized polybutadiene photo-resists. Typical examples of the cyclized polyisoprene photo-resists are "Micro Resist 747" and "Micro Resist 732" available from Eastman Kodak Co. (U.S.A.), "OMR-83" and "OMR-85" available from Tokyo Okakogyo Co., Ltd. and "JSR CIR 701" available from Japan Synthetic Rubber Co., Ltd. A typical example of the cyclized polybutadiene photo-resists is "JSR CBR-M901" available from Japan Synthetic Rubber Co., Ltd. Other types of photo-resists can also be used including those consisting mainly of poly(glycidyl methacrylate), polychloromethylstyrene, phenolic resin, chlorinated polystyrene, poly(methyl methacrylate), poly(methyl isopropenyl ketone), a polymer of an $\alpha$, $\beta$-unsaturated carboxylic acid derivative, or poly(hexafluorobutyl methacrylate). The photo-resist used in the invention may be of either negative type or positive type. Display panels having spacers formed by using the above rubber photo-resist are superior in reliability than those having spacers formed by using other photo-resists.

The photo-resists used in the invention, after irradiation with ultraviolet rays, far-ultraviolet rays, or electron beams, are developed with a suitable developing liquid (e.g. xylene) to remove the irradiated or unirradiated portions and the remaining portions are cured under suitable conditions (heating temperature and time), thus forming the intended spacers.

In the display panel of this invention, the drain electrodes 4 serve as display units for displaying images. Color filters 14 are disposed on the counter electrode substrate 7 at the positions corresponding to that of the respective drain electrodes 4. A pair of drain electrodes 4 and color filters 14 thus forms one display unit. Full color display can be accomplished by using blue, green and red color filters as each three adjacent color filters.

For the color filters, there may be used films dyed with a dye or a pigment, e.g. Carotin Pink, Brilliant Red 4 GH, or Brilliant Red BLH, as red filters; those dyed with, e.g. Diamond Green GH, malachite green, or lead phthalocyanine, as green filters; and those dyed with, e.g. Basic Cyanine 6GH, Carotin Blue GH, or copper phthalocyanine, as blue filters.

The color filters of each of the red, green and blue groups may be arranged in stripe form or mosaic form.

A color filter may be provided for each drain electrode 4 as mentioned above. Liquid display panels in which such color filters as mentioned above are arranged give good quality images since the pair of substrates is accurately registered, that is, each color filter 14 corresponds exactly to the opposing drain electrode 4 and opaque member 12, functioning as black stripes is accurately in the proper relative position on the counter electrode substrate. If the resistration is not accurate, a high quality color display cannot be obtained.

The surface to be in contact with the liquid crystal of each substrate can be coated with an insulating material. The insulation coat can be formed by a suitable method from an inorganic compound such as SiO, $SiO_2$ or $MgF_2$ or an organic compound such as polyimide, polyamide, poly(vinyl alcohol) or poly(p-xylylene). The insulation coat is subjected to aligning treatment for aligning the liquid crystal contacting therewith in a definite direction. The general method of the aligning treatment is to rub the insulation coat with velvet or cloth in a definite direction or to form an SiO or $SiO_2$ film, as the insulation coat, by oblique vapor deposition.

Figure 3:
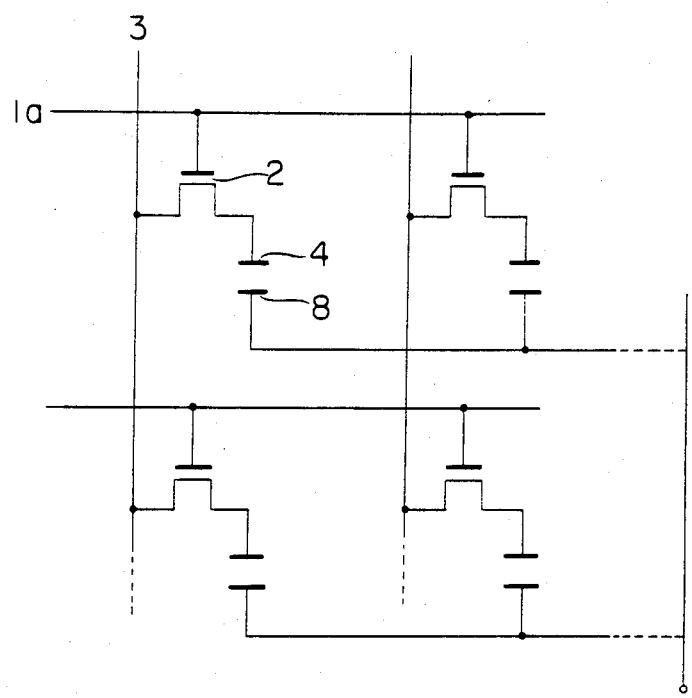
FIG. 3 is the equivalent circuit diagram of the circuit used in a display panel of the invention.

FIG. 3 shows the equivalent circuit diagram of the semiconductor driving circuit used in the display panel of the invention. For operating the circuit, scanning signals are applied to, for example, row electrodes 1a sequentially. During the application of a scanning signal to each row electrode, 1a semiconductor layers 2 lying over this on-state row electrode are in the electrically conductive state. On applying image signals to column electrodes 3, which intersect row electrodes 1a right angles, the voltages of the signals are supplied respectively to drain electrodes 4 which belong to the on-state gate electrode line. Along with the voltage scanning row electrodes 1a, voltages are supplied to a group of drain electrodes 4 when the semincoductor layers in communication with drain electrodes 4 are in the conductive state. When all row electrodes 1a are once traversed with the scanning voltage, the image signals have been applied to all the picture elements. The application of voltages to column electrodes 3 is preferably carried out in a manner other than the dot sequential supplying manner, in which signals are sent in series to picture elements, such as the line sequential supplying manner, in which signals are applied simultaneously to all drain electrodes 4 that are in the on-state gate electrode 3 line in order to maintain the effective voltage in drain electrodes 4.

As stated above, the semiconductor layers lying over a line electrode become conductive only during the moment a signal is applied to row electrode 1a, and signal voltages are applied between selected column electrodes 3 and counter electrode 8, and accordingly between counter electrode 8 and drain electrodes 4. By the application of voltages, a change is caused in the aligning state of liquid crystal molecules contained in each of the corresponding liquid crystal cells, whereby an image is displayed.

In preferred embodiments of the invention, a twisted nematic liquid crystal, as described by M. Schadt and W. Helfrich in "Voltage-Dependent Optical Activity of Twisted Nematic Liquid Crystal" of Applied Physics Letters, Vol. 18, No. 4, pp 127–128 (1971. 2, 15), (having a positive dielectric anisotropy) is interposed between base plates 5 and 7. In this case, a pair of polarizing plates (not shown), are arranged in the cross or parallel nicol state so as to interpose the display panel.

Suitable liquid crystals for twisted nematic mode herein include, for example, ZLI-1216, ZLI-1253, ZLI-1285, ZLI-1414, ZLI-1446, ZLI-1536, ZLI-1555, ZLI-1237, ZLI-1565 and ALI-1694, available from E. Merck AG. (F.R. Germany), which are mixed nematic liquid crystals with positive dielectric anisotropy. A cholesteric liquid crystal or chiral nematic liquid crystal can be added to such a mixed nematic liquid crystal. An anthraquinone colorant or cyanine colorant can also be added as dichroic coloring matter.

In the display panel of the invention, an electro-responsive element such as an electrochromic material can be used as an optical modulating material, instead of the above-mentioned liquid crystal.

Figure 2:
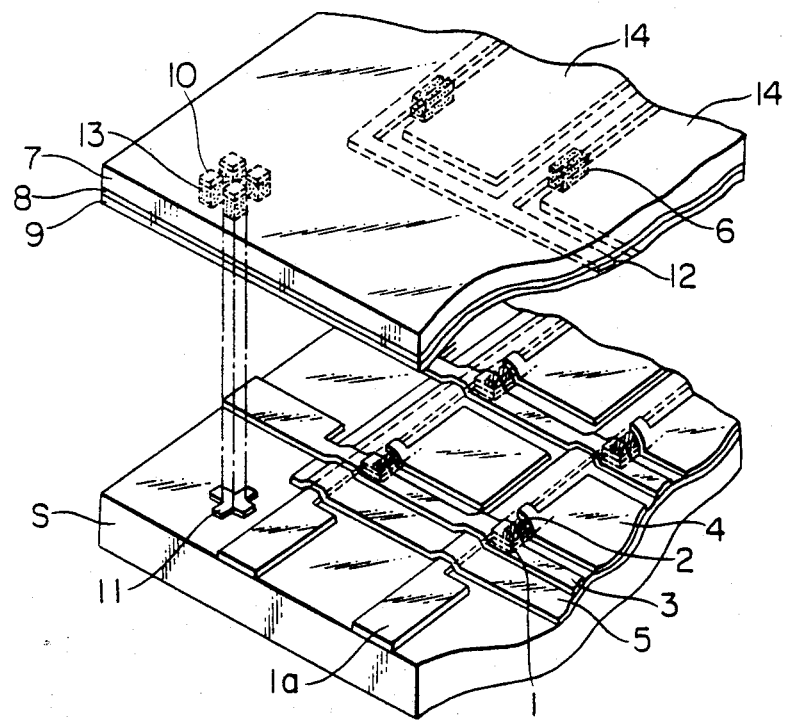

FIG. 2 is a fragmentary perspective view of a display panel showing another embodiment of the invention, which is provided with spacers 6 and a registration mark 11 on counter electrode substrates.

A registration mark 10 is formed of an opaque material on a substrate 7 and a registration mark 11 opposing to mark 10 is formed of an opaque material on substrate S. Further, the substrate 7 is provided with spacers 6 and a projection 13 for registration which are formed of the same material (e.g. a photo-resist material) and have the same thickness. Thus, no gap is formed between the registration marks 10 and 11 and, for instance, the picture elements (density: about 2–10 lines/mm) therefore can be accurately positioned. Moreover, a very close registration that is necessary for a higher picture element density and a larger display area becomes possible.

Thus, the present invention provides the following advantages:

1. The members for registration used in the invention, serving also as spacers, eliminate the space between the registration marks formed on the two substrate respectively and hence enable accurate registration of the substrates.

2. The members for registration used in the invention, serving also as spacers, are positioned outside the effective display area and hence have no adverse effect on the image displayed.

3. High quality color display can be reproduced.

4. Yields in the production process can be improved.

While the present invention has been described by way of preferred embodiments, it is to be understood that this is for illustration purposes only and the present invention should not be limited thereto, but only by the scope of the following claims.

What we claim is:

1. An optical modulating device having a layer of optical modulating substance between a pair of electrode-supporting plates, characterized in that at least one of the electrode-supporting plates is provided with a mark for registration and the other electrode-supporting plate is provided with a projection for registration at the position corresponding to that of the mark for registration.

2. The optical modulating device of claim 1, wherein the projection for registration has the function of a spacer for maintaining the gap between the pair of electrode-supporting plates.

3. The optical modulating device of claim 1, wherein the projection for registration is formed of a resin.

4. The optical modulating device of claim 3, wherein the resin is a photo-resist resin cured by light irradiation.

5. The optical modulating device of claim 3, wherein the resin is a thermosetting resin cured by heating.

6. The optical modulating device of claim 1, wherein the layer of optical modulating substance is a liquid crystal layer.

7. The optical modulating device of claim 1, wherein one of the pair of electrode-supporting plates is provided with striped color filters.

8. The optical modulating device of claim 7, wherein the color filters comprise groups of red filters, groups of blue filters, and groups of green filters, ech group of which is arranged in stripe.

9. The optical modulating device of claim 1, wherein one of the pair of electrode-supporting plates is provided with color filters in mosaic.

10. The optical modulating device of claim 9, wherein the color filters comprise groups of red filters, group of blue filters, and groups of green filters, the filters being arranged in mosaic.

11. An optical modulating device comprising a pair of substrates and a liquid crystal therebetween, one of the substrates supporting, on the inner side, transistors disposed in matrix form which have each a gate, a source, and a drain as terminals, a segment electrode which forms one display unit being disposed onto the source or drain, the other substrate supporting, on the inner side, a counter electrode opposed to the segment electrodes, characterized in that a mark for registration is put onto one of the substrates and a projection for registration is formed on the other substrate at the position corresponding to that of the mark for registration.

12. The optical modulating device of claim 11, wherein the projection for registration has the function a spacer for maintaining the predetermined gap between the pair of substrates.

13. The optical modulating device of claim 11, wherein the projection for registration is formed of a resin.

14. The optical modulating device of claim 13, wherein the resin is a photo-resist resin cured by light irradiation.

15. The optical modulating device of claim 13, wherein the resin is a thermosetting resin cured by heating.

16. The optical modulating device of claim 11, wherein the counter electrode is provided with color filters.

17. The optical modulating device of claim 16, wherein the color filters comprise groups of red filters, blue filters, and green filters each group of which is arranged in a stripe.

18. The optical modulating device of claim 16, wherein the color filters comprises groups of red filters, blue filters, green filters, and black filters each group of which are arranged in a stripe.

19. The optical modulating device of claim 16, wherein the color filters comprise groups of red filters, blue filters, and green filters each group of which are arranged in mosaic.

20. The optical modulating device of claim 11, wherein a spacer or spacers for the pair of base plates are disposed along gate wires connected to the gates or along source wires connected to the sources.

21. The optical modulating device of claim 20, wherein the spacer is formed of the same kind of resin as that forming the projection for registration.

22. The optical modulating device of claim 11, wherein the transistors are thin film transistors.

23. The optical modulating device of claim 22, wherein the thin film transistors comprise amorphous silicon as a semiconductor.

24. An optical modulating device comprising a pair of substrate and a liquid crystal therebetween, one of the substrate being provided with switching elements arranged in matrix form and with segment electrodes connected respectively to the switching elements, the other substrate supporting a counter electrode and being provided with color filters opposing respectively to the segment electrodes, characterized in that a mark for registration is put onto one of the substrates and a projection for registration is formed on the other substrates at the position corresponding to that of the mark for registration.

25. The optical modulating device of claim 24, wherein a plurality of projections for registration are disposed.

26. The optical modulating device of claim 24, wherein a plurality of color filters are disposed each color filter having a corresponding segment electrode and the color filters comprise groups of red filters, blue filters, and green filters each group of which is arranged in a stripe.

27. The optical modulating device of claim 24, wherein a plurality of color filters are disposed per each of the segment electrodes and the color filters comprise groups of red filters, blue filters, and green filters each group of which are arranged in a mosaic.

* * * * *

UNITED STATES PATENT AND TRADEMARK OFFICE
CERTIFICATE OF CORRECTION

PATENT NO. : 4,634,227  Page 1 of 3
DATED : January 6, 1987
INVENTOR(S) : Norihisa Nishimura, et al.

It is certified that error appears in the above-identified patent and that said Letters Patent is hereby corrected as shown below:

COLUMN 1

Lines 41-42, "elec-/trodes, the" should read
--electrodes arranged as a figure eight, the--.
Lines 62-63, "of optical" should read
--of an optical--.

COLUMN 2

Line 26, "(a row electrodes)" should read
--(a row of electrodes)--.
Line 30, "tellulium," should read
--tellurium,--.
Line 56, "preferably formed" should read
--preferably be formed--.
Line 61, "simiconductor" should read
--semiconductor--.

UNITED STATES PATENT AND TRADEMARK OFFICE
CERTIFICATE OF CORRECTION

PATENT NO. : 4,634,227

DATED : January 6, 1987

INVENTOR(S) : Norihisa Nishimura, et al.

It is certified that error appears in the above-identified patent and that said Letters Patent is hereby corrected as shown below:

COLUMN 4

Lines 4-5, "stripes is/accurately in" should read
--stripes in--.
Line 6, "resistration" should read --registration--.
Line 25, "electrode, 1a" should read
--electrode 1a,--.
Line 28, "1a right" should read --1a at right--.
Line 33, "seminconductor" should read
--semiconductor--.
Line 44, "3" should be --1--.

COLUMN 5

Line 14, "substrates" should read --substrate S--.
Line 18, "the substrate" should read --substrate--.
Line 31, "substrate" should read --substrates--.

UNITED STATES PATENT AND TRADEMARK OFFICE
CERTIFICATE OF CORRECTION

PATENT NO. : 4,634,227  Page 3 of 3
DATED : January 6, 1987
INVENTOR(S) : Norihisa Nishimura, et al.

It is certified that error appears in the above-identified patent and that said Letters Patent is hereby corrected as shown below:

COLUMN 6

Line 6, "ech" should read --each--.
Lines 28-29, "function/a" should read
    --function of a--.
Line 48, "comprises" should read --comprise--.
Line 68, "substrate" should read --substrates--.

COLUMN 7

Line 1, "substrate" should read --substrates--.

Signed and Sealed this

Seventh Day of July, 1987

Attest:

DONALD J QUIGG

Attesting Officer

Commissioner of Patents and Trademarks